United States Patent [19]

Arbeitman et al.

[11] Patent Number: 5,528,266

[45] Date of Patent: Jun. 18, 1996

[54] FLAT TOUCH SCREEN WORKPAD FOR A DATA PROCESSING SYSTEM

[75] Inventors: Gordon W. Arbeitman, Gaithersburg, Md.; Frank L. Stein, Vienna, Va.; Alan R. Tannenbaum, Washington Grove; Robert L. Donaldson, Annapolis, both of Md.

[73] Assignee: International Business Machines Corporation, Armonk, N.Y.

[21] Appl. No.: 73,261

[22] Filed: Jun. 8, 1993

Related U.S. Application Data

[63] Continuation of Ser. No. 351,227, May 15, 1989, abandoned.

[51] Int. Cl.[6] .................................................. G09G 5/00
[52] U.S. Cl. ........................................ 345/173; 345/156
[58] Field of Search .................................. 340/706, 710, 340/711, 712, 784; 341/33, 34; 364/709.01, 709.02, 709.12; 178/18, 19, 20; 345/173, 179, 182, 174, 175, 156

[56] References Cited

U.S. PATENT DOCUMENTS

| | | | |
|---|---|---|---|
| 4,110,749 | 8/1978 | Janko et al. | 340/712 |
| 4,186,392 | 1/1980 | Holz | 340/712 |
| 4,310,839 | 1/1982 | Schwerdt | 340/712 |
| 4,369,440 | 1/1983 | Piguet et al. | 340/712 |
| 4,386,232 | 5/1983 | Slater | 340/712 |
| 4,475,239 | 10/1984 | van Raamsdonk | 382/57 |
| 4,545,023 | 10/1985 | Mizzi | 364/709 |
| 4,550,221 | 10/1985 | Mabusth | 340/712 |
| 4,611,406 | 9/1986 | Engstrom et al. | 33/443 |
| 4,665,501 | 5/1987 | Saldin et al. | 340/711 |
| 4,686,332 | 8/1987 | Greanias et al. | 178/19 |
| 4,703,316 | 10/1987 | Sherbeck | 340/712 |
| 4,710,760 | 12/1987 | Kasday | 340/712 |
| 4,725,694 | 2/1988 | Auer et al. | 178/18 |
| 4,742,478 | 5/1988 | Nigro, Jr. et al. | 364/708 |
| 4,763,291 | 8/1988 | Schwaber | 340/711 |
| 4,763,356 | 8/1988 | Day, Jr. et al. | 379/368 |
| 4,814,760 | 3/1989 | Johnston et al. | 340/784 |
| 4,827,410 | 5/1989 | Corren | 364/200 |
| 4,903,012 | 2/1990 | Ohuchi | 340/712 |
| 5,053,757 | 10/1991 | Meadows | 340/712 |
| 5,175,625 | 12/1992 | Miles | 345/173 |

OTHER PUBLICATIONS

IBM TDB "Device Driver for a Touchpad or Touch Screen Computer Input Device" vol. 30, No. 4, Sep. 1987, pp. 1674–1676.

*Primary Examiner*—Richard Hjerpe
*Assistant Examiner*—Chanh Nguyen
*Attorney, Agent, or Firm*—Joseph C. Redmond, Jr.; Martin J. McKinley

[57] ABSTRACT

Improvements in the art of sensor and display technology now make the implementation of a workpad concept feasible. While prior art touch displays are acceptable for short, casual use tasks, they may not be feasible or suited for intensive use tasks. Recent improvements in the optical qualities (brightness, contrast, viewing cone) of flat panel displays, such as LCDs, allow implementing a touch screen for use in a horizontal orientation. This greatly improves the human factors for applications involving extensive pointing, drawing, or writing.

9 Claims, 9 Drawing Sheets

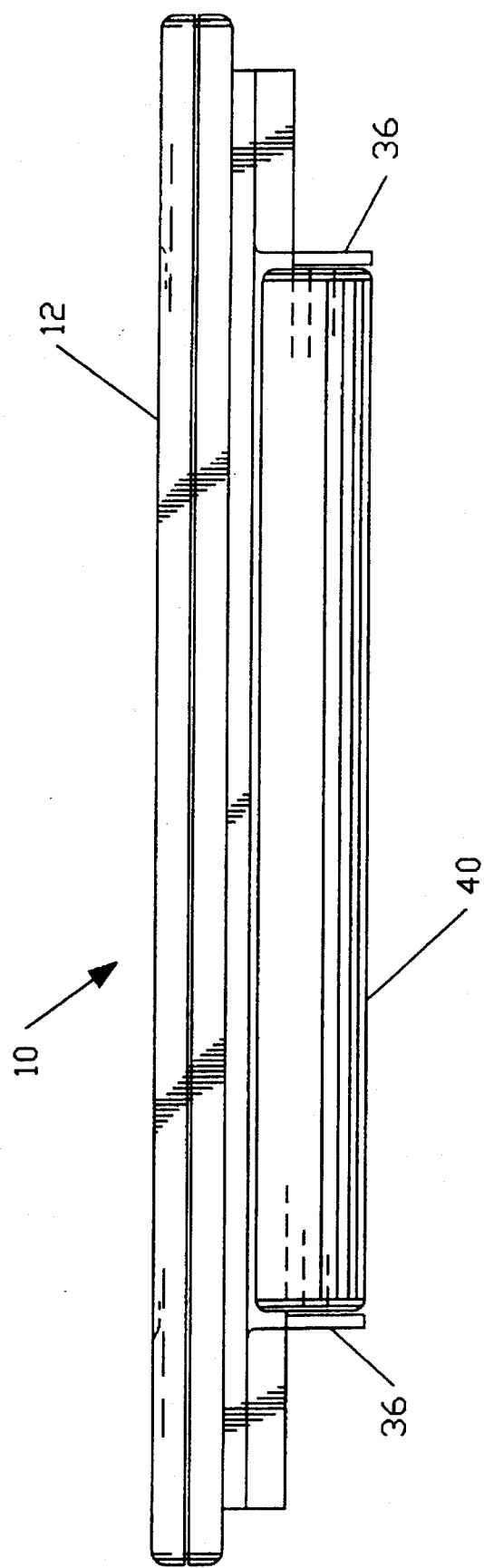

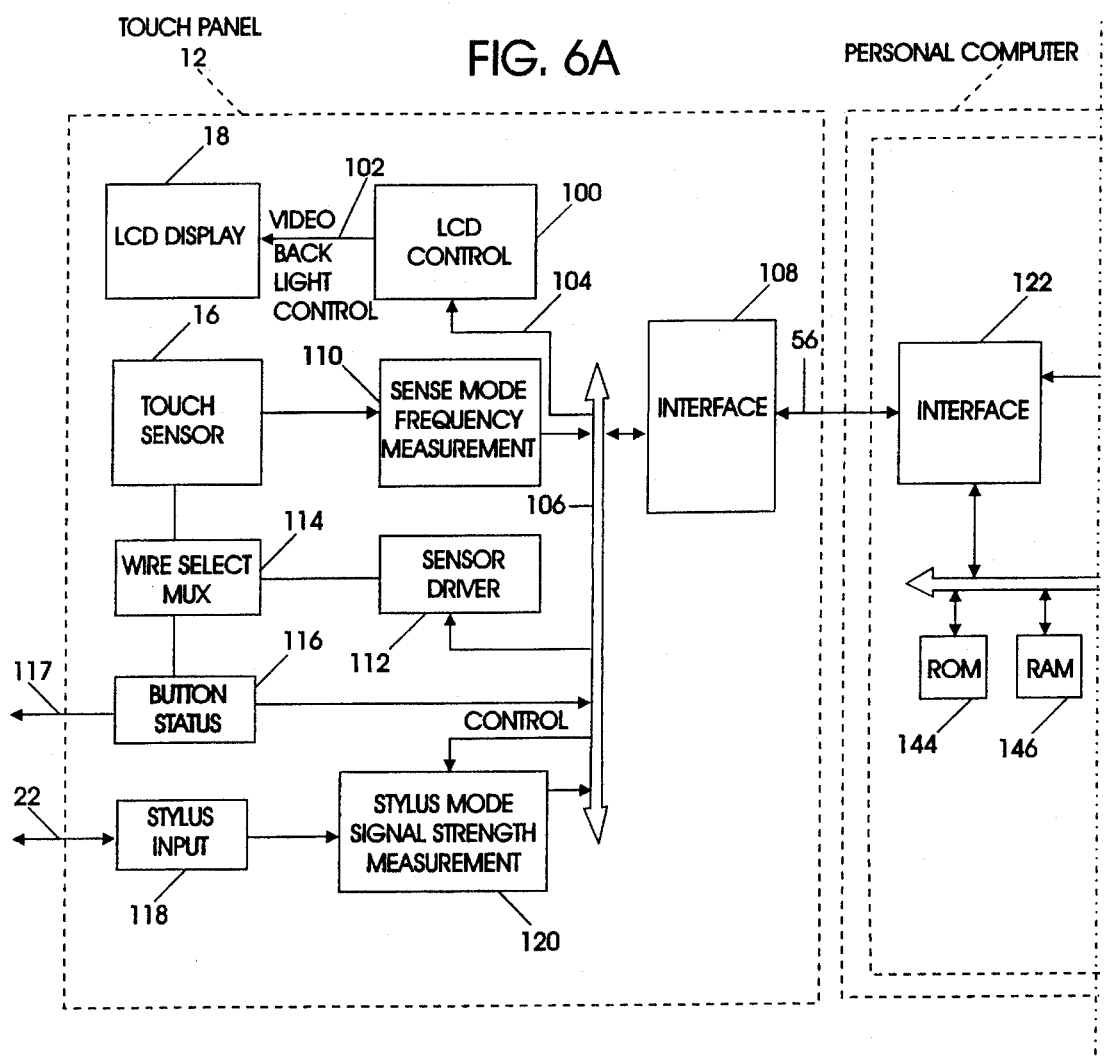

FLAT TOUCH SCREEN WORKPAD FOR A DATA PROCESSING SYSTEM

This is a continuation of application Ser. No. 07/351,227 filed May 15, 1989, now abandoned.

DESCRIPTION

1. Technical Field

This invention relates to a workpad that serves as both an input and an output (I/O) device for a data processing system. More particularly, the invention relates to a flat display device combined with a touch panel and button switches which provide a generally horizontal viewing and work surface, the button switches being program interpretable and usable to emulate the operation of mouse buttons, function keys and the like.

2. Background Art

Touch panels have been developed for use with cathode ray tube (CRT) display devices, the combination being connected to a data processor for use as both an input and output device. An example of such a system is described in U.S. Pat. No. 4,686,332-Greanias et al., "Combined Finger Touch and Stylus Detection System for use on the Viewing Surface of a Visual Display Device," said patent being assigned to the assignee of the present invention. The advantage of such a system is that a touch panel provides user friendly interaction with a data processing system. One disadvantage of such a system in accordance with the prior art is that because the touch panel is placed on the vertical viewing face of a CRT, the user has to reach out in order to touch the panel or use this stylus. When the user does this for an extended period of time, such action becomes tiresome, uncomfortable and tedious.

The physical dimensions of a CRT make it difficult to design a display having a horizontal viewing surface upon which a touch panel can be mounted. Further, a CRT is rather bulky and heavy, making it difficult to move the touch input device to positions which are more convenient or efficient for the user. Another disadvantage is that the CRT display uses coaxial cables or wires. Such coax wiring is relatively heavy and stiff which also detracts from the ability to readily move the display device from one position to another. Further, CRT displays consume considerable power requiring the use of a separate power cable. The CRT based devices therefore are operated at a fixed location.

In addition, the use of touch input devices and the attendant display screens have been limited by the availability of computer programs. Typically, the touch panels are used to select actions or graphic display panels in response to a user touch on particular menu selections displayed on the screen. Many more complex computer applications, particularly for a personal computer, have been written for keyboard or mouse pointing device input. It would be an advantage to design a touch input device which could emulate the input of a wide variety of input devices, including the mouse and the keyboard, to take advantage of the many existing applications programs based upon such devices.

SUMMARY OF THE INVENTION

Improvements in the art of sensor and display technology now make the implementation of a workpad concept feasible. While prior art touch displays are acceptable for short, casual use tasks, they may not be feasible or suited for intensive use tasks. Recent improvements in the optical qualities (brightness, contrast, viewing cone) of flat panel displays, such as LCDs, allow implementing a touch screen for use in a horizontal orientation. This greatly improves the human factors for applications involving extensive pointing, drawing, or writing.

The design objectives associated with the design of the invention are to provide a touch input device that is a significant improvement over existing touch screens, as well as other inputs devices in an office environment, that meet the following requirements:

Input
- detection of finger position
- detection of stylus position for detail work
- spaaial resolution as good as current mouse devices
- temporal resolution adequate for handwriting applications and mouse point-and-drag operations
- support for multiple value input at each touch position, e.g., mouse buttons 1 and 2
- operation without a separate keyboard for most applications Display
- operation in office ambient lighting
- support for IBM VGA video standard
- support for at least 8 shades of gray
- adequate contrast and viewing angle for day-long use
- support for simultaneous use of standard color CRT Physical Configuration
- nearly horizontal orientation with adequate arm support
- convenient laptop use for intensive thought tasks
- flexible one cable attachment to computer

OBJECTS OF THE INVENTION

It is therefore an object of the invention to provide a touch panel display device or workpad that can be readily handled by a user and operated in a variety of positions, including a substantially horizontal position upon the user's lap or upon a desk top, as dictated by the convenience of the user and the need for adequate arm support.

Another object is to allow a maximum freedom of movement between the workpad and the rest of the data processing to which it is connected thereby permitting its use in positions or locations comfortable and efficient for the user, including a standing position.

Still another object is to provide a high resolution workpad that can be readily moved about due in part to the use of a flexible coiled cable connected between the workpad and a data processor.

Still a further object is to emulate a variety of types of input from a single touch input device, including touch, keyboard, mouse and gesture input data formats.

Another object is to provide a touch panel display device that utilizes a liquid crystal display combined with an overlayed touch panel that is actuated by either a finger touch or a proximity of a stylus to the panel, with additional switches or buttons which are program controlled and may be used to emulated mouse buttons.

Briefly, in accordance with the preferred embodiment of the invention, the above objects and advantages are obtained by a light weight relatively flat workpad connected by a flexible coiled cable to a personal computer. A liquid crystal display is mounted in the workpad and has a rectangular viewing face overlayed with a transplant touch panel. The stylus is connected to the workpad and the touch panel is activated by either a finger touch or by bringing the stylus into contact or near contact therewith. Electrical controls are partially mounted in the workpad and partially in the personal computer. At least one button switch is mounted on the workpad housing adjacent to the viewing surface and in such a position as to be selectively actuated by hand of the user while the other hand of the user is manipulating the stylus or touching the touch panel. Under program control, the switch can emulate a switch found on a mouse pointing device, a function key or a keyboard.

BRIEF DESCRIPTION OF THE DRAWINGS

FIG. 3 is an end view of the workpad shown in FIG. 1;

DESCRIPTION OF THE BEST MODE FOR CARRYING OUT THE INVENTION

Figure 1:
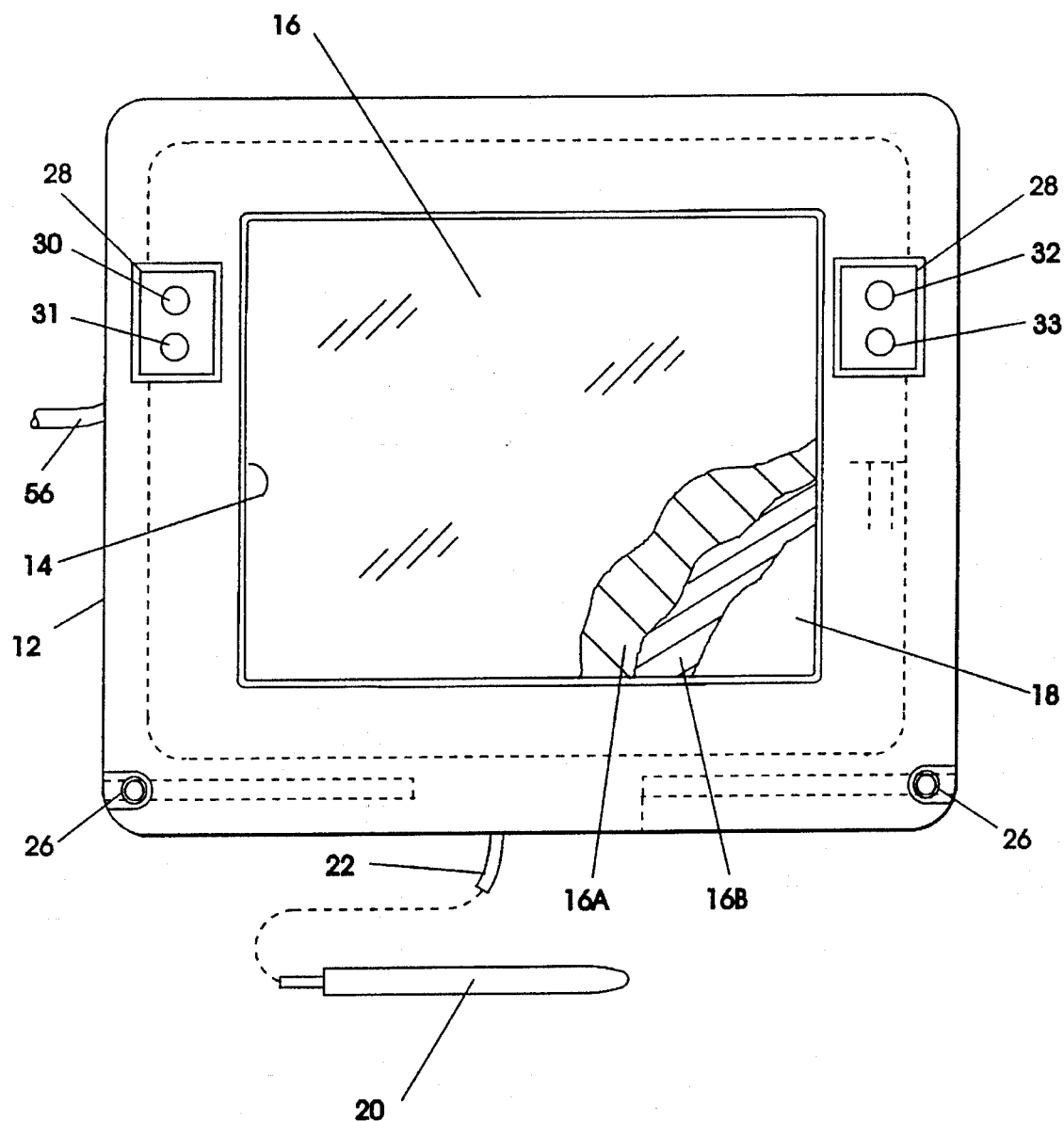
FIG. 1 is a top view of a workpad designed in accordance with the present invention.

Referring now to the drawings, and first to FIG. 1, a workpad 10 comprises a housing 12 provided with a rectangular recessed window 14 that surrounds the edges of a rectangular touch panel 16. Touch panel 16 is transparent and overlays an LCD 18 which, because of the rectangular window 14, provides a rectangular viewing surface. The combination of the touch panel and display is referred to hereinafter as a "touch screen" 19. Panel 16 includes a multiplicity of embedded, transparent conductors 16A orthogonally positioned relative to a multiplicity of conductors 16B. The resolution of stylus position provided by the orthogonal lines 16a and 16b correspond substantially to resolution provided by the number of pixels in LCD 18. Touch panel 16 is constructed similar to the touch panel described in the aforementioned U.S. Pat. No. 4,686,332.

Figure 2:
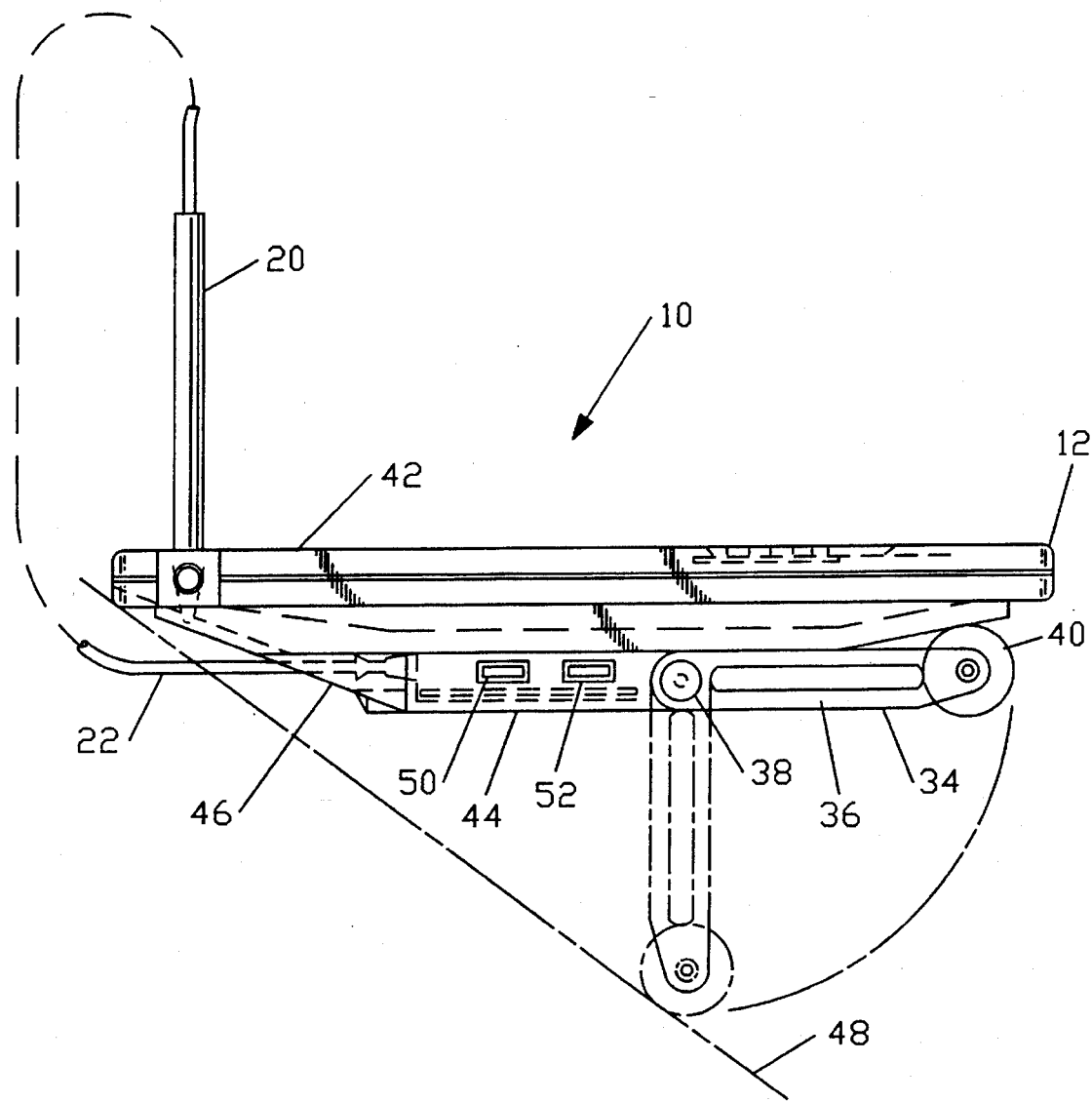
FIG. 2 is a side view of the workpad shown in FIG. 1.

A detection or pickup stylus 20 is connected by cable 22 to workpad 10 and is of a size similar to a pen or pencil such that the stylus can be manually grasped and moved about within constraints of the length of cable 22. Cable 22 is flexible to facilitate such movement and use. Stylus 20 has a tapered working end within which is enclosed a pickup coil (not shown) of a size relative the conductors 16 A and B that provides detailed resolution greater than that encounter when a finger is used to touch the panel, allowing the stylus to be used for work more detailed than that obtainable by use of finger touch. Housing 12 has two side opening recesses in which stylus 20 can be placed for storage. Housing 12 further has two upwardly facing recesses to accommodate the tip of the stylus whereby the stylus can be supported in a more readily available position, such as shown in FIG. 2, when not in use. Recesses 24 and 26 are lined with metal walls to shield the tip of the stylus and prevent unwanted pickup from the conductors 16 A and B when the stylus is out of use and stored away. Recesses 26 are located in the lower corners of housing 14 as viewed in FIG. 2.

Window 14 and touch panel 16 and LCD 18 occupy most of the area of the top of workpad 10 and the housing surrounding the window is in the form of a rectangular annular frame, such frame having two laterally spaced rectangular recesses 28 formed in the sides near the top of such frame. Mounted in such recesses are four button switches 30–33, there being two switches at each side. The switches are round, when viewed as in FIG. 2, and are substantially flat having a thickness approximately the same as the depth of a recess 28. The switches are designed to be manually actuated by the fingers of a user. When used to emulate mouse buttons, the switches are set up for both left-handed and right-handed operation where, e.g., switches 31 and 33 are used as mouse button 1 and switches 30 and 32 are used as mouse button 2. It is expected that a right-handed user would rest finger of his or her left hand on or near buttons 30 and 31 leaving the right hand free to control the display cursor by use of the right-hand fingers or by a stylus held in the right hand. An alternative implementation of the switches would be to implement them as part of the touch screen by providing an oversize display including areas not needed for the normal display, and under program control, outlining areas to be touched for actuation in the manner of the mechanical switches. These buttons are single pole, single throw, momentary action push button switches. The buttons can be programmed in software to provide various application-specific functions. For example, the buttons can be programmed to emulate the functions of mouse button 1 and button 2 when depressed. They can be programmed in software to operate as four independent buttons or as two sets of parallel buttons. Momentary action or latched action can also be defined by appropriate software.

A tilt stand or support 34 is mounted on the underside of housing 12 and includes two laterally spaced arms 36 connected at one end to and mounted for rotation about pivot pins 38. The other ends of the arms are connected to and support a cylinder 40 of a soft plastic or rubber that extends between the two arms. Together, arms 36 and cylinder 40 form a U-shaped support 34 which is moveable between the full line position shown in FIG. 2 to the dotted line position. In any position along such path of movement, support 34 is frictionally held in place and will not give under the weight of workpad 10. When support 34 is in the full line position, cylinder 40 does not extend beneath the bottom flat surface 44 of housing 12. When moved to any other position, support 34 will support workpad 10 on a work surface at an angle up to about 35 degrees. The work surface could be a desk top or the lap of user. The bottom surface 44 and the top surface of housing 12 are flat and parallel to one another but spaced apart by the depth of the housing or workpad. When the bottom surface 44 is resting on a flat horizontal surface, the upper surface 42 is also horizontal, as is the touch panel and viewing face of the LCD so that the viewing face is exposed for view in such position.

It should be appreciated that when used on the lap of the user, support 34 may or may not be used. Further, the support could be extended downwardly and grasped between the knees of the user to provide a more secure support than that provided merely by resting workpad 10 on the user's lap. The overall dimensions of workpad 10 are approximately 11" by 14" by 2" (so that it is of a size that can be readily handled by a user and supported on a lap. Relative brightness and contrast control knobs 50 and 52 are mounted on the underside of housing 12 and exposed for manual rotation from the side thereof. The weight of workpad 10 is 1.8 Kg.

Figure 4:
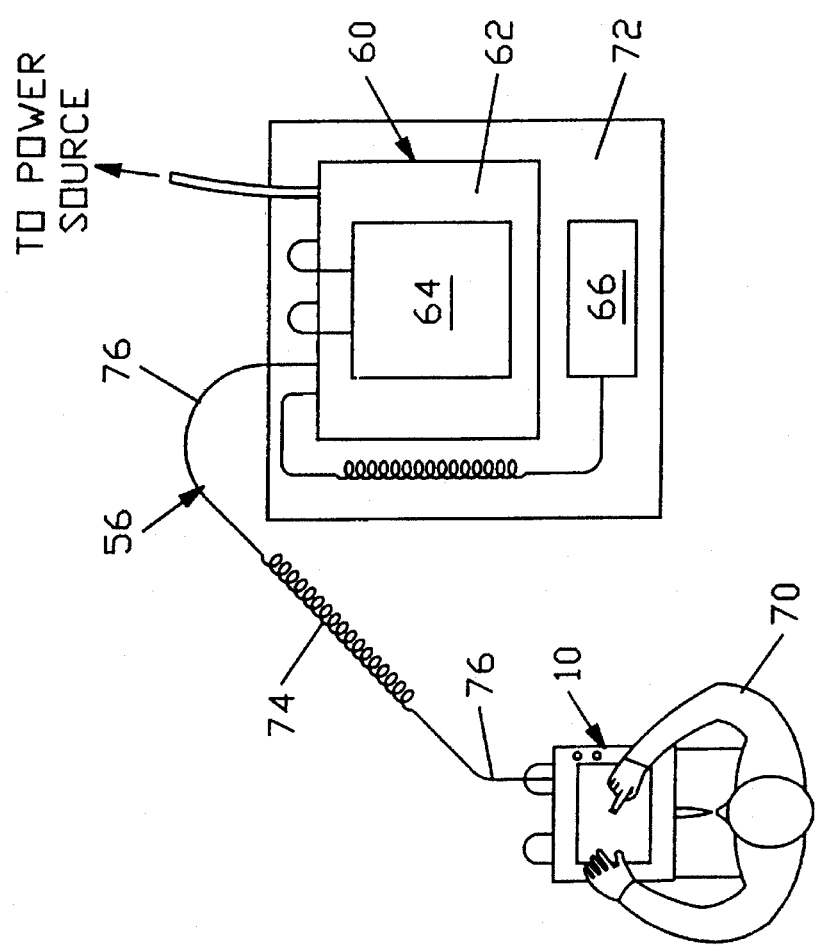
FIG. 4 is a schematic diagram of a data processing system embodying the invention and showing one mode of interaction therewith by a user.

Referring to FIG. 4, workpad 10 is connected to a personal computer 60 through a single cable 56. Computer 60 comprises a system unit 62, a display 64 and a keyboard 66. This figure also shows a user 70 supporting workpad 10 on the user's lap while the personal computer is supported on a table or desk top 72 at a distance from the user. Cord 56 has an extensible medial coiled portion 74 connected between two non-coiled ends 76. The extended length of cord 56 is preferably sixteen feet allowing the user to move the workpad to many different positions that are comfortable. Quite obviously, such length is illustrative only and other lengths can be used.

Figure 5:
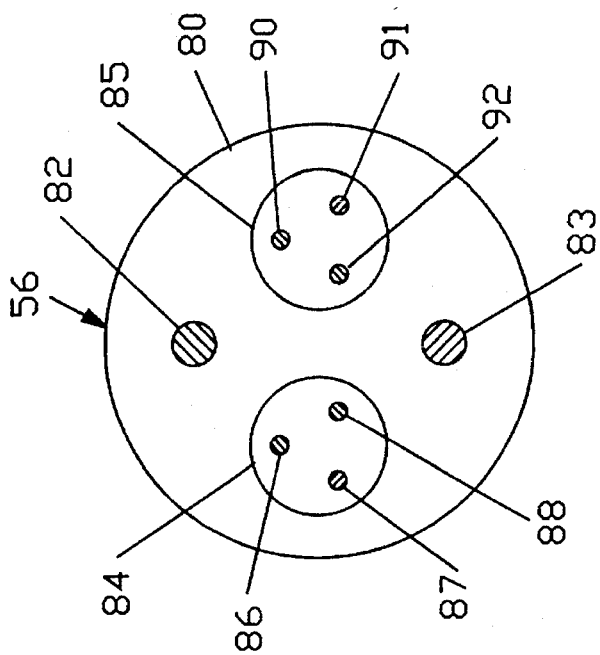
FIG. 5 is a schematic cross-sectional view through the cable which connects the workpad to a personal computer as shown in FIG. 4.

As shown in FIG. 5, cable 56 comprises an outer insulating sheath 80 surrounding two insulated wires 82 and 83 and two triple twisted wire cables 84 and 85. These latter cables house insulated wires 86, 87, and 88, and 90,91 and 92. Wires 82 and 83 provide 0 and −5 volt power, wires 88 and 91 provide +12 and −12 volt power, wires 86 and 87 are signal wires for balanced transmission from the workpad to the computer, and wires 90 and 92 are signal wires for the balanced transmission from the computer to the workpad. Thus, all the needed conductors for carrying the necessary power and signals to operate workpad 10 are contained in a single cable.

Figures 6, 6B:
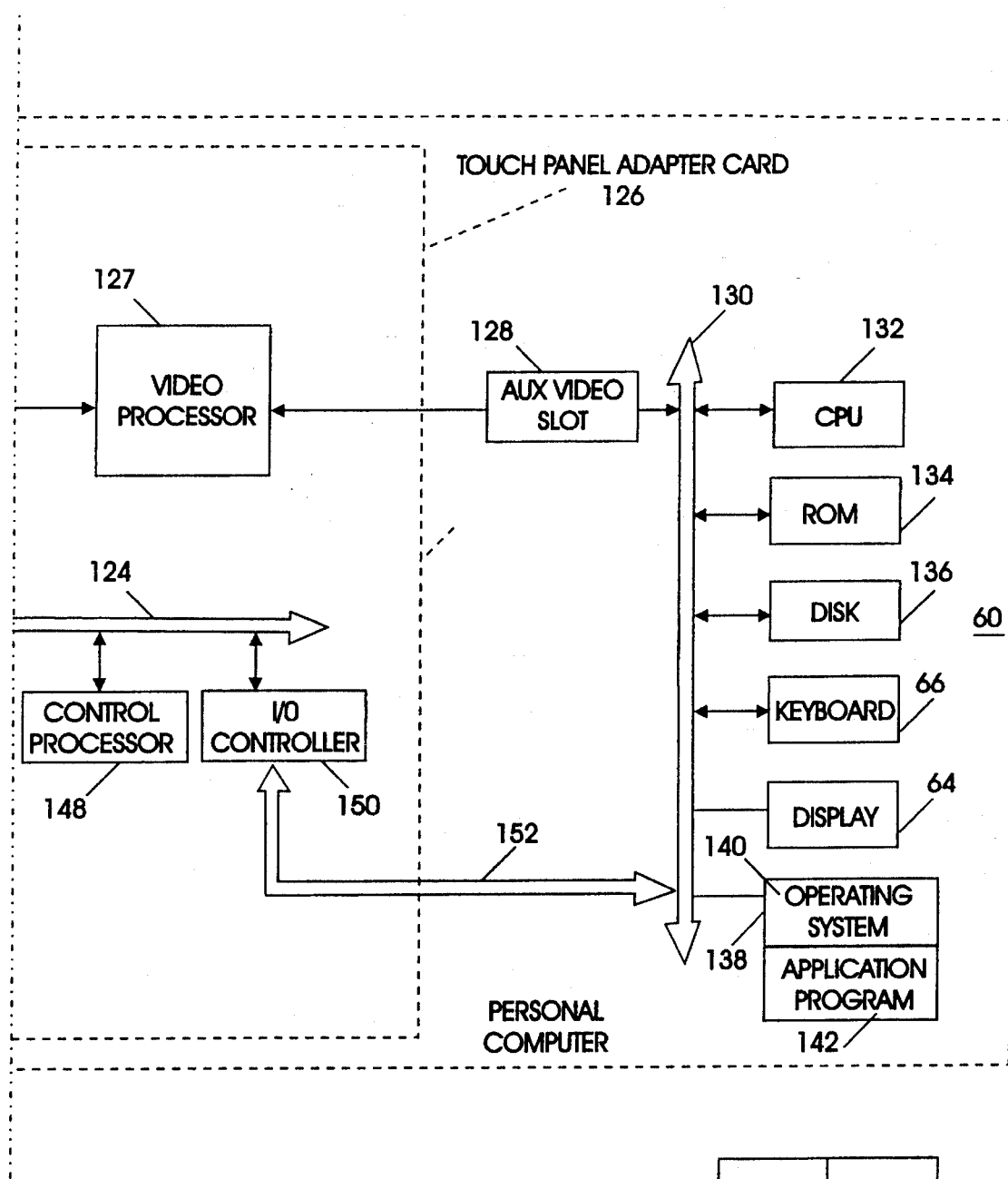
FIG. 6, which consists of FIGS. 6A and 6B, is a block diagram of certain of the electrical portions of the invention.

Referring now to FIG. 6, which consists of FIGS. 6A and 6B, mounted within housing 12 of workpad 10 are various electrical circuits which obtain power through cable 56 and which are operated under the control of personal computer 60. Display 18 is connected through line 102 to an LCD control 100 which in turn is connected through line 104 to a bus 106. Interface 108 is connected to bus 106 and to cable 56 whereby operation of display is done with signals and commands sent over line 56 from the computer. Touch sensor 16 is connected to a sense mode frequency measurement circuit 110 and to a wire select multiplexer 114. A sensor driver 112 connects between mux 114 and bus 106, and operates to detect when and where a finger touches the tough screen. A button status circuit 116, described in detail below, is connected to the button switches 30–33 through line 117. Line 22 from the stylus is connected to a stylus input circuit 118 which in turn is connected to a stylus mode signal strength measurement circuit 120, the latter being connected to bus 106.

A touch panel adapter card 126 is mounted in the computer and has an interface 122 connected to cable 56. A video processor 127 is connected to interface 122 and to the auxiliary video slot 128 of computer 60. Computer 60 includes standard items such as a CPU 132, ROM 134, Disk 136, keyboard 66, display 64 and a memory 138 which stores an operating system 140 and application program 142 for execution thereof. Card 126 also includes a bus connected to interface 122 and to a ROM 144, RAM 146, control processor 148 and I/O controller 150. Controller 150 is connected to bus 130 through line 152.

Figure 7:
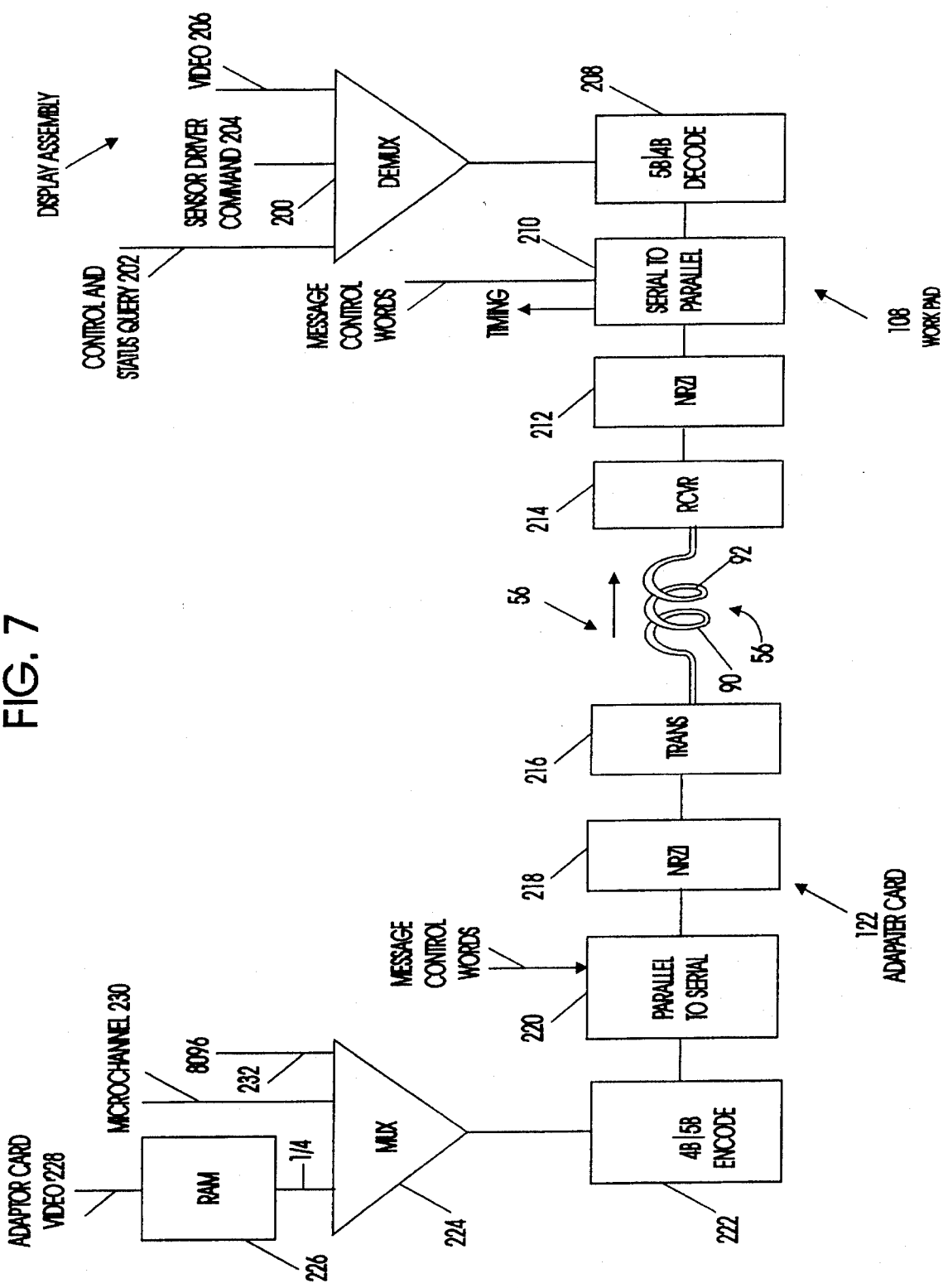
FIG. 7 is a more detailed block diagram of the computer to display channel of communication.

As shown in FIG. 7, interface 122 includes a RAM 226 which receives and stores video signals and outputs ¼ at a time to a multiplexer (mux) 224 so that the video display requires four frames of signal to fully change the display. Mux 224 provides signals to a parallel to serial converter 220 which outputs to a non-return to zero invert (NRZI) circuit 218 and a transmitter (trans) 216. Signals are transferred over lines 90 and 92 of cable 56 from trans 216 to a receiver (rcvr) 214. The signals then pass through a serial-to-parallel converter 210, 5B/4B decoder and a demultiplexer 200. The latter provides separate signals on lines 202, 204 and 206 send various signals to the display such as control, status query, sensor driver commands and video signals.

Figure 8:
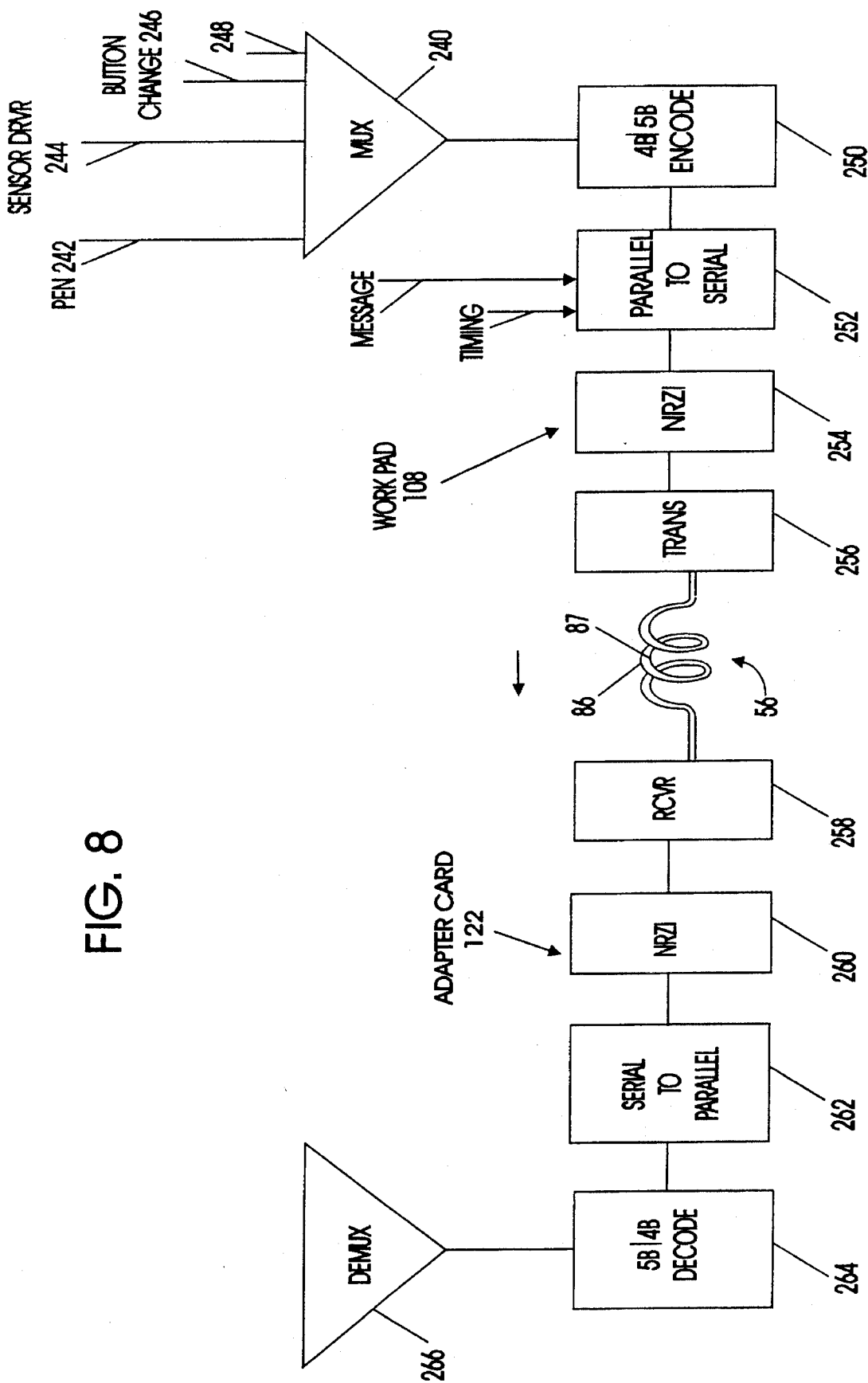
FIG. 8 is a more detailed block diagram of the display to computer channel of communication.

The signals being transmitted from the display to the computer pass through the channel shown in FIG. 8 which is similar to the channel shown in FIG. 7. Input signals on lines 242, 244, 246 and 240 are inputted to MUX 240 and pass through encoder 250, converter 252, NRZI circuit 254, trans 256, lines 86 and 87, rcvr 258, circuit 260, converter 262, decoder 264 to a demux 266 where they are fed to the computer.

Figure 9:
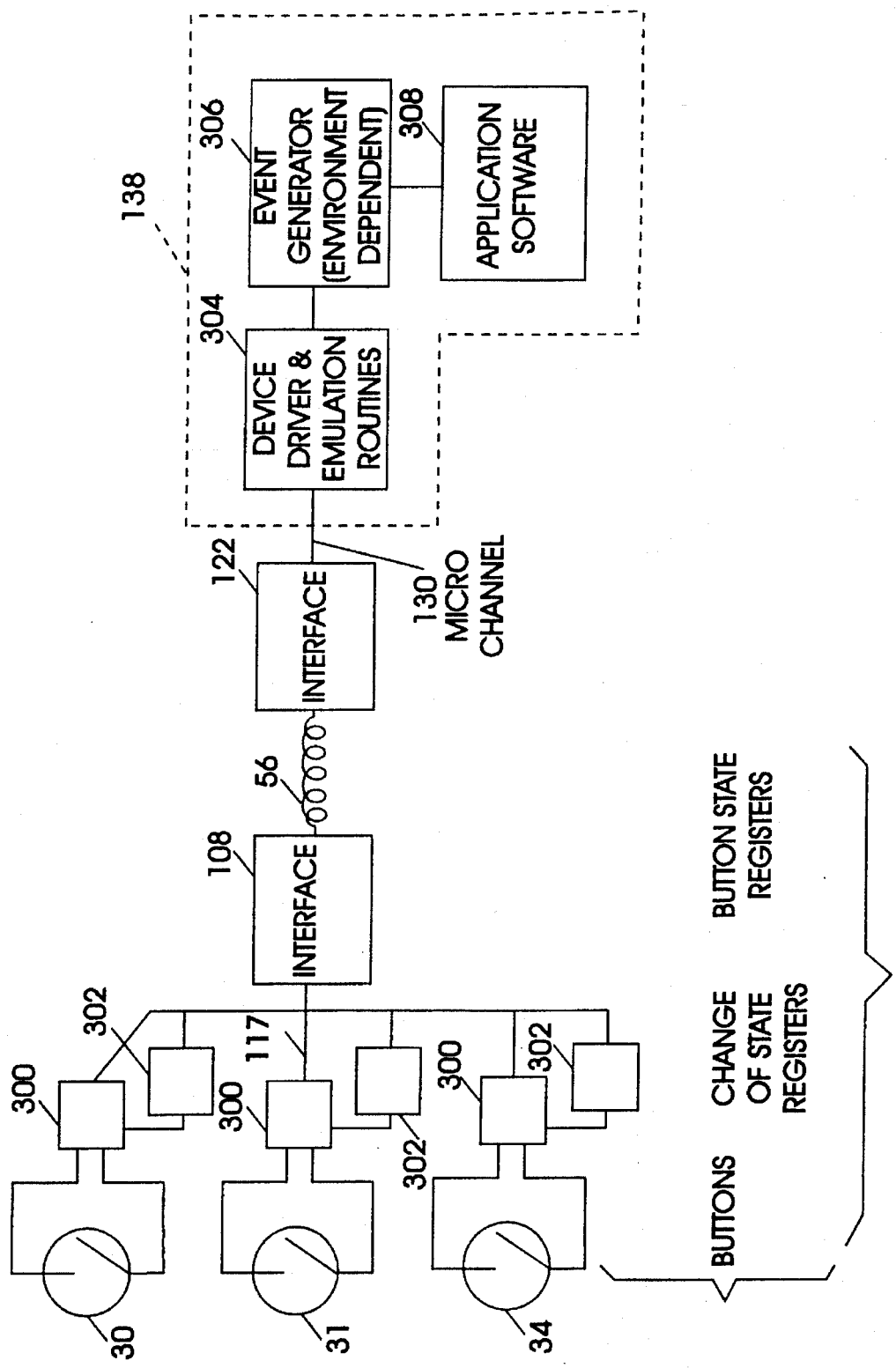
FIG. 9 is a block diagram useful in understanding the programmed operation of the button switches.

FIG. 9 generally shows the manner in which buttons 30–33 are operated under program control. The button switches are connected respectively to a series of change of state registers 300 which in turn are connected to button state registers 302. Upon actuation of any switch, it will enable its associated register and send to the associated register 302 a code specifically identifying the switch that was actuated and an interrupt signal will be sent over lines 117 to the computer 60. An interrupt handling routine will then query state register 302 and obtain therefrom the code signifying which switch was actuated. Deactuation of a switch will also cause an interrupt. Memory 138 stores the programs for interpreting the switches which will include device driver and emulation routines 304, an event generator, environment dependent routine 306 and application software 308. The emulation routines 304 can interpret the switches to represent mouse buttons or functions keys to enable the workpad to be used with application programs written for such support. Alternately, the application software itself 308 can interpret the keys directly.

It should be apparent to those skilled in the art that many changes can be made in the details and arrangements of parts without departing from the scope of the invention as defined in the appended claims.

What is claimed is:

1. In a data processing system, a workpad connected to a computer, the workpad including a touch sensor activated via an electrically operated stylus and a finger actuated control button, the improvement comprising: a RAM coupled to the computer for storing up to four (4) frames of data;

a first multiplexer coupled to the RAM for receiving and sending control/data signals to a display in the workpad;

a first demultiplexer coupled to the display for receiving and applying the control/data signals to the display;

a second multiplexer in said workpad coupled to said display and to said computer, said second multiplexer having a first input connected to said tough sensor and a second input connected to said control button, for sequentially ordering signals output from said touch sensor and from said button in an order of occurrence of said touch sensor signals and said button signals, and delivering said ordered signals to said computer; and a second demultiplexer in said computer for receiving said sequential signals from said second multiplexer to detect whether said button signal occurred before said touch signal.

2. The data processing system of claim 1 further including a plurality of finger actuated control buttons, each button electrically coupled to a change of state register and a button state register;

a memory containing stored programs for interpreting the state of the button state register; and means for using the stored programs to emulate a variety of types of inputs from the workpad.

3. The data processing system of claim 2 wherein actuation of a control button generates a code identifying the control button which was actuated and initiates an interrupt signal to the computer to activate an interrupt handling routine which will query the state of the button state registers to identify the button which was actuated.

4. The data processing system of claim 1 wherein the finger control buttons can emulate a mouse pointing device under control of the stored programs.

5. The data processing system of claim 1 wherein the finger control buttons can emulate a function key under control of the stored programs.

6. The data processing system of claim 1 wherein the finger control button is mounted on the workpad to be actuated by one hand of a user while the other hand of the user is manipulating the touch sensor.

7. In a data processing system, a workpad having an electrically operated stylus overlay and first and second finger actuated action buttons, said workpad coupled to a computer for exchanging data therebetween, the improvement comprising:

a RAM coupled to the computer for storing up to four (4) frames of data;

a first multiplexer coupled to the RAM for receiving and sending control/data signals to a display in the workpad;

a first demultiplexer coupled to the display for receiving and applying the control/data signals to the display;

a second multiplexer in said workpad coupled to said display and to said computer, said second multiplexer having a first input coupled to said first action button for receiving first button signals, a second input coupled to said second action button for receiving second button signals and a third input coupled to said stylus overlay for receiving stylus input signals;

said second multiplexer having an output for outputting said first button signals, said second button signals and said stylus input signals in order of their occurrence;

a second demultiplexer associated with said computer, having an input coupled to said output of said second multiplexer and having an output coupled to said computer, for providing to said computer said first button signals, said second button signals and said stylus input signals in said order of their occurrence; and said computer selectively utilizing said stylus input signals in response to said order of occurrence of said stylus input signals with respect to the occurrence of said first and second button signals.

8. In a data processing system having a workpad with a touch overlay actuated via an electrically operated stylus and first and second finger actuated action buttons, said workpad coupled to a computer for exchanging data therebetween, the method comprising:

storing up to four frames (4) of data in a RAM coupled to the computer; combining control signals and the data in a first multiplexer coupled to the RAM;

receiving the control signals and the data in a first demultiplexer in the workpad;

applying the control signals and the data to the display;

receiving first button signals from said first action button, receiving second button signals from said second action button and receiving touch input signals from said touch overlay in a second multiplexer in said workpad;

outputting said first button signals, said second button signals and said touch input signals in order of their occurrence in a data stream, from said second multiplexer;

providing to said computer said first button signals, said second button signals and said touch input signals in said order of their occurrence from a second demultiplexer associated with said computer, having an input coupled to receive said data stream from said second multiplexer; and selectively utilizing said touch input signals in said computer in response to said order of occurrence of said touch input signals with respect to the occurrence of said first and second button signals.

9. In a data processing system having a workpad actuated by an electrically operated stylus overlay and first and second finger actuated action buttons, said workpad coupled to a computer for exchanging data therebetween, the method comprising: storing up to four frames (4) of data in a RAM coupled to the computer;

combining control signals and the data in a first multiplexer coupled to the RAM;

receiving the control signals and the data in a first demultiplexer in the workpad;

applying the control signals and the data to the display;

receiving first button signals from said first action button, receiving said second button signals from said second action button and receiving stylus input signals from said stylus overlay in a second multiplexer in said workpad; outputting said first button signals, said second button signals and said stylus input signals in an order of their occurrence in a data stream, from said second multiplexer;

providing to said computer said first button signals, said second button signals and said stylus input signals in said order of their occurrence from a second demultiplexer associated with said computer, having an input coupled to receive said data stream from said multiplexer; and selectively utilizing said stylus input signals in said computer in response to said order of occurrence of said stylus input signals with respect to the occurrence of said first and second button signals.

* * * * *